(No Model.)
J. A. FURMAN.
DIE FOR MOLDING MOUTH PIECES FOR WHISTLES, &c., OF CELLULOID.
No. 365,768. Patented June 28, 1887.
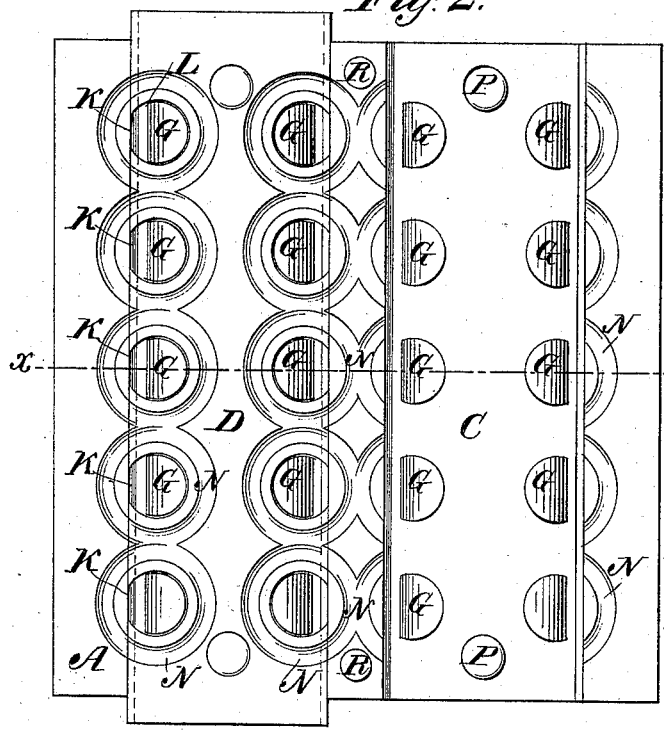 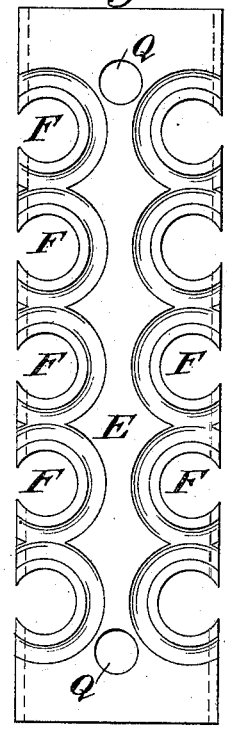
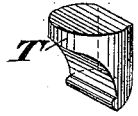
WITNESSES:
Thomas Hunt.
Henry E. Everding.
INVENTOR
John A. Furman
BY
C. Wyllys Betts
ATTORNEY

UNITED STATES PATENT OFFICE.

JOHN A. FURMAN, OF NEWARK, NEW JERSEY, ASSIGNOR OF ONE-HALF TO THE CELLULOID NOVELTY COMPANY, OF NEW YORK, N. Y.

DIE FOR MOLDING MOUTH-PIECES FOR WHISTLES, &c., OF CELLULOID.

SPECIFICATION forming part of Letters Patent No. 365,768, dated June 28, 1887.

Application filed September 29, 1886. Serial No. 214,830. (No model.)

*To all whom it may concern:*

Be it known that I, JOHN A. FURMAN, a citizen of the United States, residing at Newark, in the county of Essex and State of New Jersey, have invented certain new and useful Improvements in Dies for Molding Mouth-Pieces for Whistles or Similar Articles of Celluloid or Analogous Materials, of which the following is a specification, reference being had therein to the accompanying drawings.

My invention relates to improvements in dies for molding the mouth-pieces of whistles or similar articles out of celluloid or analogous materials; and the object of my improvement is to produce the said articles more cheaply and with greater rapidity than can be done by the processes heretofore used. I attain this object by the mechanism shown in the accompanying drawings, in which—

Figure 1 is a vertical transverse section of the dies upon the line X X, Fig. 2. Fig. 2 is a view from above, one of the central plates being removed to show the bottom plate and the plungers projecting therefrom. Fig. 3 is a top view of the plate. Fig. 4 is the mouth-piece or the article produced by the dies.

Similar letters refer to similar parts throughout the several views.

A is the bottom plate, having one or more openings, B C, formed therein for the insertion of the central plates, D E. These openings B C have their sides beveled or inclined toward one another, so that they are smaller at the bottom than at the top, as shown in Fig. 1. The central plates, D E, have their sides beveled or inclined to correspond with the sides of the openings B C, so that they will closely fit said openings when inserted therein, as shown at D, Fig. 2.

At the sides of the central plates, D E, are vertically bored a series of apertures, F, each forming the segment of a circle, the center of which is within the lines of the central plate, E, as shown in Fig. 3.

Projecting from the bottom plate, C, are double-curved plungers G, corresponding in number and position with the apertures F, as shown in Fig. 3, each of said plungers G fitting closely the curve of its corresponding aperture F, and, as viewed from above, forming the segment of a circle smaller than the segment F. Each of these plungers G has its upper surface curved, as shown in Fig. 1, and it is also preferably undercut close to the bottom plate, A, as shown at H, Fig. 1. Thus when the central plate, D, is placed upon the bottom plate, A, a space, J, will be left between the beveled side of the bottom plate at K, Fig. 2, and the curved sides of the aperture F at L, Fig. 2, and the curved top of the plunger G. Into this space the celluloid or analogous material is placed. The top plate, M, is then firmly pressed upon the central plate, D, and the celluloid is forced to take the form of the opening J, the surplus material, if any, overflowing into the recesses N, which are cut in the bottom plate and central plate around the apertures F. The guides P, projecting from the bottom plate, pass through the openings Q in the central plate, and thus retain the two plates in proper position. Guide-pins R, projecting from the bottom plate, pass through opening S, Fig. 1, in the top plate.

When the articles have been pressed into shape, as aforesaid, the top plate, M, is first removed. The central plates, D and E, are then raised from the openings B C, and the mouth-pieces T, Fig. 4, are left between the plungers G and the sides K of the bottom plate. When the plungers G are undercut, the mouth-pieces are removed by sliding them sidewise away from the bottom plate.

What I claim as my invention, and desire to secure by Letters Patent, is—

1. Dies for molding the mouth-pieces of whistles or similar articles, consisting of the bottom plate, A, with one or more recesses, C, having tapering sides K and double-curved plungers G projecting from said bottom plate, the central plate, D, having at the side thereof apertures F, corresponding with plungers G, and the top plate, M, substantially as described.

2. Dies for molding the mouth-pieces of whistles, consisting of the bottom plate, A, with one or more recesses, C, having tapering sides K and double-curved plungers G projecting from said bottom plate, and having the under-cut H, the central plate, D, having at the side thereof apertures F, corresponding with plungers G, and the top plate, M, substantially as described.

In testimony whereof I affix my signature in presence of two witnesses.

JOHN A. FURMAN.

Witnesses:
   C. WYLLYS BETTS,
   THOMAS HUNT.